UNITED STATES PATENT OFFICE.

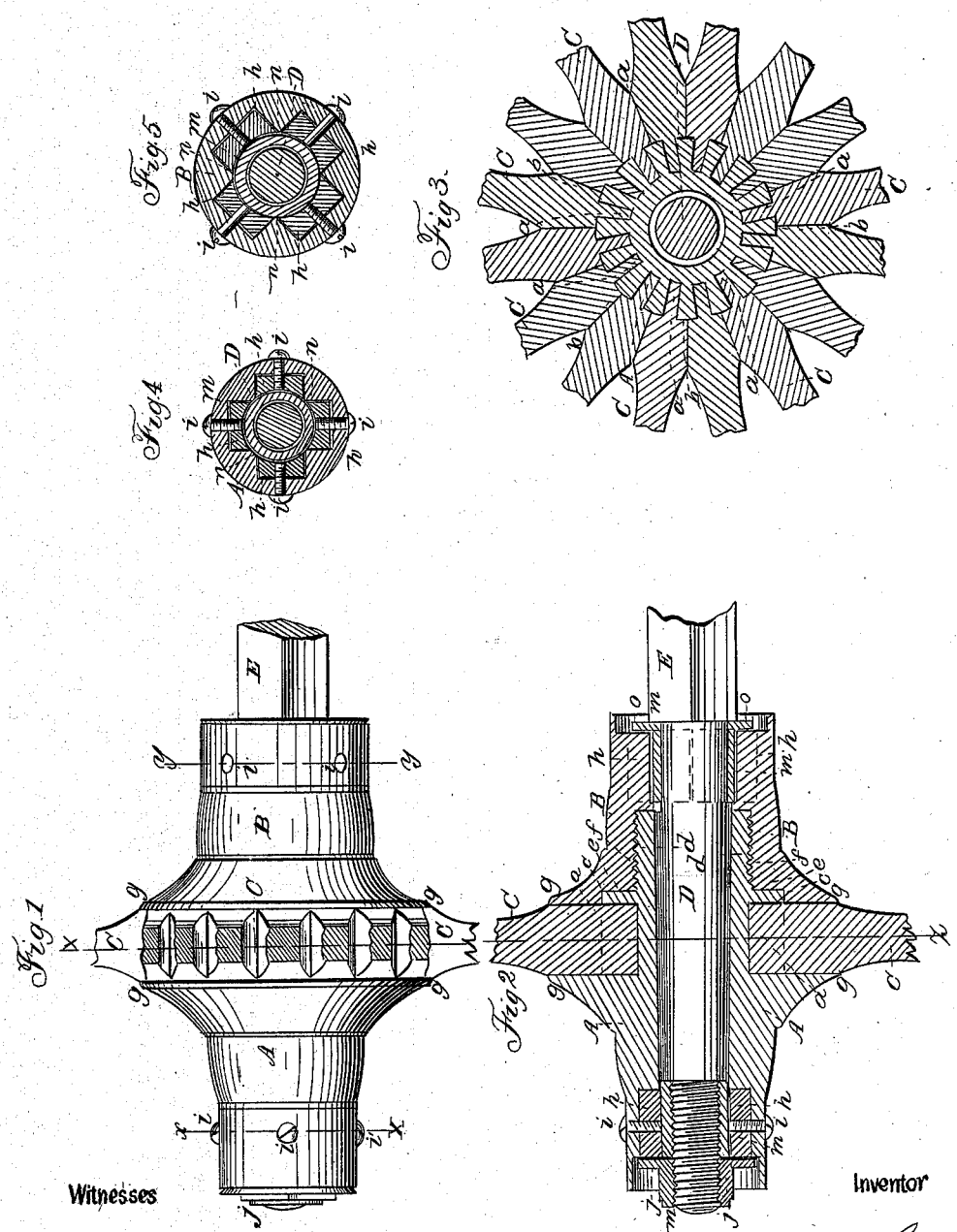

ROBERT W. McCLELLAND, OF SPRINGFIELD, ILLINOIS.

IMPROVEMENT IN HUBS AND JOURNALS FOR CARRIAGE-WHEELS.

Specification forming part of Letters Patent No. 35,531, dated June 10, 1862.

*To all whom it may concern:*

Be it known that I, ROBERT W. McCLELLAND, of Springfield, in the county of Sangamon and State of Illinois, have invented a new and useful Improvement in Hubs and Journals for Carriage-Wheels; and I do hereby declare the following to be a full, clear, and exact description of the same, reference being had to the accompanying drawings, making a part of this specification, in which—

Figure 1 represents a view of the hub with the spokes broken away, as also a portion of the axle. Fig. 2 represents a longitudinal section taken centrally through the same, the journal being in full. Fig. 3 represents a vertical transverse section taken through the center of the hub and spokes, as at $z\ z$. Fig. 4 represents a transverse section through the hub and journal at the red line $x\ x$ of Fig. 1, and Fig. 5 represents a similar section taken at the red line $y\ y$ of Fig. 1.

Similar letters of reference, where they occur in the separate figures, denote like parts in all the drawings.

I am aware that cast-iron hubs in sections have been used and that the butts of the spokes have been arched therein. The great objection to such hubs as heretofore constructed has been the difficulty in repairing the wheel and in inserting in a substantial manner a new spoke when this becomes necessary—an occurrence that frequently happens.

My invention consists, first, in driving in the tenoned spokes radially into one of the sections of the hub so as to form an arch, when used in combination with a metallic shoulder, flange, and recess, to brace and bind the two sections of which the hub is composed to each other and to the arched part of the spokes.

It also consists in combining with a cast-iron hub sectional adjustable boxes to take the bearings of the axle-journal; and it further consists in combining with the boxes in the hub the removable or independent bearings on the journal, said independent bearings being screwed, chucked, or keyed to the journals, so that they may be removed when necessary to repair or replace them.

To enable others skilled in the art to make and use my invention, I will proceed to describe the same with reference to the drawings.

The hub is composed mainly of two sections of cast-iron, viz: a front section, A, and a rear section, B. The front section, A, is furnished with recesses or mortises to receive the tenons $a\ a\ a$, &c., of the spokes C, which are driven in radially and so as to arch or brace against each other, as shown at $b$, Fig. 3. This front section has also formed upon it a shoulder, $c$, and beyond the shoulder a male screw, $d$. The rear section, B, has a recess, $e$, in it to receive the shoulder $c$ of the front section, and a female screw-thread, $f$, to receive the male screw $d$ on said front section, and when the two sections are screwed up together their flanges $g\ g$ clamp the spokes as far out as to the point where the spokes cease to brace or arch each other, or thereabout, and thus they strengthen each other as well as the spokes, there being both metal contact - surfaces and metal and wood contact-surfaces, which break joint with each other, so as to leave no weak point. By unscrewing the section B a spoke may be introduced into the wheel with the greatest facility without disturbing any other portions of the wheel, and when the section B is again run on the wheel has all of its original rigidity, notwithstanding new spokes may have taken the place of the original ones.

In the point and heel of the cast-iron hub thus made I insert in suitable recesses made for the purpose a box composed of sections $h\ h\ h$, (three or more,) which may be made of iron, steel, brass, or any other metal or alloy of metals, and behind these sections are adjusting-screws $i\ i\ i$, by which they may be set up, as they wear away, against the bearings $m\ m$ on the journal D of the axle E, and when thus set up against these bearings a piece of tin or other thin metal should be put behind them to keep them firm in their seats or recesses. The sections do not touch each other, there being a slight space, $n$, between each to admit of their approaching the center of the hub as they are adjusted, and this space $n$ also forms an oil-chamber for containing some lubricator that will supply itself to the journal-bearings $m\ m$, which are at the heel and point of the journal.

The bearing at the point of the journal D, I have represented as being screwed onto the same thread that the nut $j$ runs on to hold the wheel to the journal. The other bearing at the heel of the journal I have represented as being chucked on. Both of them are removable, so that when they become worn they may be removed and others put in their places, and thus avoid the expense of a new journal. So, too, of the sections that compose the box—when they become too much worn to keep the wheel steady on its journal or to prevent rattling, they may be removed and replaced by others.

In cast-iron hubs as heretofore made the metal of the hub made its boxes, and when worn there was no way of keeping the wheel tight on its bearings. The journals, also, were of a single piece, furnishing their own surfaces as bearing-surfaces, and when worn there was no means of making them fill their boxes, and the rattling between the hub and journal was so unpleasant as to condemn the whole. All these objections I have avoided, and have so perfected this kind of hub and journal as to make them light, strong, cheap, very durable, and entirely noiseless in their action, while the facility with which they can be repaired is equal to if not greater than that of any wheel, however made, of hub, spokes, and rim.

Should this wheel become dished by use, it can be brought back to its proper form by loosening the section B, placing some thin metal against the sides of the arch of the spokes, and running up the section again tightly, which effectually accomplishes the object. To screw up or unscrew the section B, I remove two of the opposite sections, $h\ h$, and insert a bar or wrench into their recesses, which admits of very great power, and by which it may be readily removed or replaced.

I have represented the rear bearing on the journal as having a flange, $o$, on it. This flange may form the bearing for the heel of the hub, and the flange serves the purpose of making a surface beyond the axle, against which a blow or force may be applied when it is necessary to start off the bearing from the journal, particularly when it is chucked on, as in this case. If this rear bearing is screwed or keyed on, then the end support for the hub may be connected to or be a part of the axle itself, instead of the bearing, as here shown.

Having thus fully described my invention, what I claim therein as new, and desire to secure by Letters Patent, is—

1. In connection with a cast-iron hub made in two sections, the driving in of the spokes radially into one of the sections, in combination with the shoulder, recess, flanges, and screw-threads to brace and bind the two sections to each other and to the arched part of the spokes, substantially as described.

2. In combination with a cast-iron hub, sectional, adjustable, and removable metal boxes to take the bearings of the journals, substantially as and for the purpose set forth.

3. In combination with sectional, adjustable boxes in the hub, the removable bearings on the journal of the axle, substantially as and for the purpose set forth.

R. W. McCLELLAND.

Witnesses:
A. B. STOUGHTON,
H. W. PRICE.